United States Patent Office 3,479,294
Patented Nov. 18, 1969

3,479,294
BORON EXTRACTANT COMPOSITIONS
Friedrich J. Weck, Trona, Calif., assignor, by mesne assignments, to American Potash & Chemical Corporation, a corporation of Delaware
No Drawing. Filed June 21, 1961, Ser. No. 118,526
Int. Cl. B01d *15/00;* C07c *39/27*
U.S. Cl. 252—182                    2 Claims The present invention relates to certain disubstituted ortho-alcoholphenol compounds and has particular reference to such compounds in which the substitutents in the para position and in the other ortho position may include halogens as well as certain alkyl and aryl groups. The invention also relates to methods for preparing such compounds.

The novel compounds of this invention are particularly suitable for use as extractants for recovering boron values from boron-containing brines. This particular use for these compounds is disclosed and claimed in co-pending application Ser. No. 118,519, now U.S. Patent No. 3,111,-338, filed of even date herewith and assigned to the same assignee as the present invention.

The compounds of this invention also are suitable for use in reducing the boron content of irrigation water commonly used in the western parts of the United States to a non-toxic level, as well as for materially reducing the boron content of oil well brines.

Broadly, the novel compounds of this invention may be defined as disubstituted ortho-alcoholphenol compounds in which the substituents in the para position and in the other ortho position are seletced from the group consisting of halogen, alkyl groups, and aryl groups.

More specifically, the compounds of this invention may be defined as coming within either of the two classes I or II detailed hereinafter.

The first class of compounds comprises disubstituted ortho-alcoholphenol compounds having the formula (II)

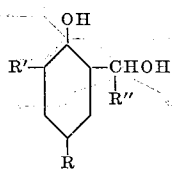

wherein either R or R' is halogen and the other is selected from the group consisting of alkyl groups having from 4 to 24 carbon atoms per group or aryl groups having from 6 to 24 carbon atoms per group. R" in the above formula is either hydrogen, alkyl groups having from 1 to 7 carbon atoms or aryl groups having from 6 to 10 carbon atoms.

Compounds within class I above may be prepared conveniently by reacting a phenol having the formula

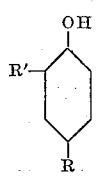

wherein R and R' have the values as indicated above with an aldehyde of the formula R"CHO wherein R" is either hydrogen, an alkyl group of 1 to 7 carbon atoms or an aryl group of 6 to 10 carbon atoms.

Compounds of the second class may be defined as disubstituted ortho-alcoholphenol compounds having the formula (II)

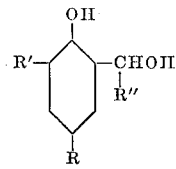

wherein R and R' are selected from the group consisting of alkyl groups having from 2 to 22 carbon atoms and aryl groups having from 6 to 22 carbon atoms; the sum of the carbon atoms of R and R' being from 8 to 24. R", in the Formula II above, is either hydrogen, an alkyl group having from 1 to 7 carbon atoms or an aryl group having from 6 to 10 carbon atoms.

Compounds within class II above may be prepared conveniently by reacting a phenol having the formula

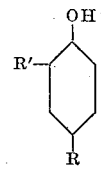

wherein R and R' have the values set forth hereinabove with respect to Formula II with an aldehyde of the formula R"CHO wherein R" is hydrogen, an alkyl group having from 1 to 7 carbon atoms or an aryl group having from 6 to 10 carbon atoms.

Because of the presence of the R and R' groups in the ortho and para positions, the novel compounds of this invention exhibit unusual stability in that they have a lowered tendency to split off water and/or an aldehyde and condense to form undesirable polymers which may not be used, for example, as boron extractants. The R and R' groups decrease the activity of the functional hydroxyl groups of these compounds. The presence of the herein specified alkyl group or aryl group results in compounds distinguished by the fact that they exhibit high solubility in common organic solvents, e.g. kerosene or octane, and, concomitantly, low solubility in alkaline brine solutions, thus rendering them particularly suitable for use as extractants for borate ions contained in brine solutions. The high solubility in organic solvents makes it possible for these compounds to be used with readily available and inexpensive carriers.

Examples of suitable aldehydes having the formula R"CHO which may be employed in the practice of the present invention include formaldehyde, formalin, paraformaldehyde, acetaldehyde, butyraldehyde, propionaldehyde, valeraldehyde, capronaldehyde, heptaldehyde, benzaldehyde, cinnamic aldehyde, naphthaldehyde, and the like.

In preparing the novel compounds of this invention, it is essential that at least 1 mol of aldehyde be employed for each 1 mol of the phenolic starting material used. More than 1 mol of aldehyde may be used, if desired. In general, the upper limit on the amount of aldehyde employed is established only by economic considerations.

The aldehyde-phenol condensation reaction preferably is carried out at a temperature within the range of from about 50° C. to about 95° C. for a period of time in excess of about one hour. If temperatures below 50° C. are employed the reaction proceeds too slowly. If temperatures higher than 95° C. are employed the products are obtainable from the reaction mixture with undue difficulty.

The aldehyde-phenol condensation reaction should be carried out in the presence of an alkaline catalyst. While sodium hydroxide, potassium hydroxide and the like may be used as a catalyst, particularly satisfactory results are obtained when an alkaline borate is employed. Examples of suitable alkaline borates include sodium borate, borax, mixtures of boric acid and alkalies, and the like. Satisfactory results are obtained when the catalyst is used in amounts up to about 1%, based on the total weight of the aldehyde and phenol employed, although amounts up to about 5% may be used, if desired. When alkaline borate is employed, the boron should be present in amounts of at least a half mol of boron per mol of phenol.

If the aldehyde-phenol reaction is carried out in the presence of an alkali such as sodium hydroxide, the reaction proceeds substantially as follows:

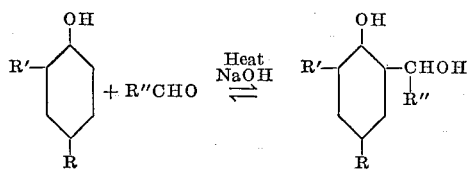

If, on the other hand, the aldehyde-phenol condensation reaction is carried out in the presence of an alkaline borate, such as sodium borate, a novel boron complex forms substantially as follows:

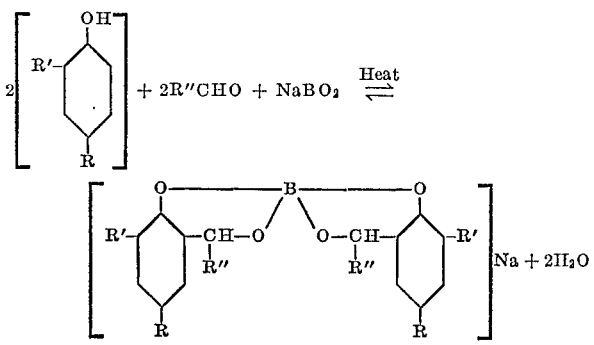

The boron complex formed, as illustrated above, may be conveniently treated with a quantity of a dilute mineral acid to break the complex and release the compound of this invention. In carrying out these reactions, in addition to the sodium ion, the other alkali metals such as lithium, potassium, rubidium, and cesium may be used as well as the ammonium ion.

In order to illustrate this invention even more fully, the following specific examples are set forth. These examples are presented for illustrative purposes only and are not intended to limit the scope of the invention in any manner.

Example 1.—2-bromo-4-nonyl-6-methylolphenol 78 gm. of 2-bromo-4-nonylphenol (0.26 mol) are mixed with a solution of 10.4 gm. of NaOH in 110 ml. of water and 39 ml. of an aqueous formaldehyde solution (0.52 mol). The mixture is reacted for three hours at 80° C., while stirring. Upon standing, the organic phase (crude 2-bromo-4-nonyl-6-methylolphenol) is precipitated as a yellow, sticky oil. Yield, based on phenol, is about 90%.

Example 2.—2-chloro-4-nonyl-6-methylolphenol 60 gm. of 2-chloro-4-nonylphenol (0.25 mol) are mixed with a solution of 9.2 gm. of NaOH in 110 ml. of water and 35 ml. of an aqueous 37 percent solution of formaldehyde (0.46 mol). The mixture is reacted for 3 hours at 80° C. while stirring. Upon standing, a yellow sticky precipitate is obtained. The yield, based on phenol used, is about 90%.

Example 3.—2-chloro-4-tertiarybutyl-6-methylolphenol

A solution of 50 gm. of sodium hydroxide (1.25 mol) and 62 gm. of boric acid (1 mol) in 500 ml. of water is added to 181 gm. of raw 2-chloro-4-tertiarybutylphenol (approximately 0.9 mol) and heated while vigorously stirring. When a temperature of 65° C. is reached, the addition of 100 ml. of a 36.1% aqueous solution of formaldehyde is begun. The initially milky mixture clears after about 20 minutes. The addition of formaldehyde is finshed after two hours. After a third hour, the mixture turns cloudy and solidifies slowly while forming a soft crystalline mass. After standing overnight, the reaction mixture is repulped in 5 liters of cold water for the removal of the water-soluble components, and 205 gm. of a white, flaky material is obtained by vacuum filtration. After repulping in 600 ml. of benzene for the removal of the organic impurities, 95 gm. of a white crystalline material (borate complex) are obtained. The melting point is over 350° F. The crystals are tested for boron content by suspending one gram of the material in 30 ml. of benzene and contacting the suspension three times with 60 ml. of 0.1 N sulfuric acid, thus stripping the chelate of boron ions. The boron content of the aqueous phase is then determined by titration with alkali in the presence of mannitol (Scott's Standard Methods of Chemical Analysis I, 5th Edition, New York, D. van Nostrand Publishing Co. 1939, p. 170). Boron equivalent to 30.5 ml. 0.1 N boric acid is found in the aqueous phase, and indicates that the precipitate consists of a mixture of mono- and di-saligenin borate complexes, as can be concluded from the following calculations.

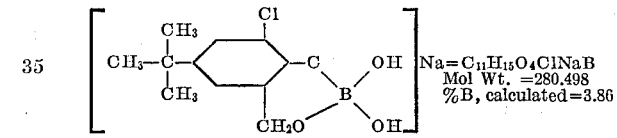

One gm. of the above complex represents 0.0036 mol for which the boron content should be equivalent to 36 ml. of 0.1 N boric acid.

(b) The di-haligenin borate complex:

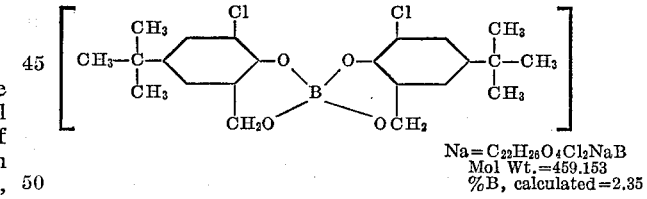

One gm. of the di-saligenin complex corresponds to 0.0021 mol for which the boron content should be equivalent of 21 ml. of 0.1 N boric acid.

Since the titrated equivalent of the one gm. sample obtained by synthesis represents a value between these calculated figures, it can be concluded that the precipitate consists of a mixture of mono- and di-saligenin borate complexes. The estimated conversion of phenol to saligenin is 90%.

Example 4.—2-bromo-4-phenyl-6-methylolphenol 24.9 gm. of 2-bromo-4-phenylphenol (0.1 mol) are suspended in a solution of 4.0 gm. of NaOH (0.1 mol) and 9.5 gm. of borax (0.25 mol) in 270 ml. of water plus 20 ml. of methanol. The methylolation reaction is started by adding 5.1 gm. of paraformaldehyde (0.15 mol) to the mixture and shaking it at room temperature for several days. The reaction is rather slow under these conditions and has to be completed by stirring the mixture at 80° C. for three hours.

Example 5.—2-chloro-4-(1,1,3,3-tetramethylbutyl) 6-methylolphenol 4. gm. of NaOH (0.1 mol) are dissolved in 80 ml. of water and 241 gm. (1 mol) of 2-chloro-4-(1,1,3,3-tetramethylbutyl-phenol are blended in by stirring. Thereafter, 140 ml. of a 37% aqueous formaldehyde solution (approximately 1.5 mol) are added, and agitation is continued at 60° C. for 24 hours. The reaction product is then neutralized with 0.1 N sulfuric acid and washed with water. The resulting viscous yellow mass consists of crude, approximately 70% 2-chloro-4-(1,1,3,3-tetramethylbutyl)-6-methylolphenol.

Example 6.—2-cyclohexyl-4-chloro-6-methylolphenol 4.9 gm. of sodium hydroxide (0.12 mol) and 19.1 gm. of borax (0.2 mol of boron) are dissolved in 100 ml. of water, and 10 ml. of methanol are added. 43 gm. of finely ground 2 - cyclohexyl - 4 - chlorophenol (0.2 mol) are blended in and the temperature is raised to 50° C. while stirred. After the addition of 24.5 gm. of 37% formaldehyde (0.3 mol), the temperature is raised to reflux, and the mixture is kept there for 27 hours. After cooling, the crystalline slurry is stripped of its boron content by contact with dilute sulfuric acid in the presence of 200 ml. of benzene. The benzene layer is then dried with sodium sulfate, and the benzene is evaporated in vacuo. The resulting 2-cyclohexyl-4-chloro-6-methylolphenol is obtained as an amber, clear liquid.

Example 7.—2-chloro-4-nonyl-6-(1-hydroxyethyl)-phenol 400 ml. of a water solution containing 50 gm. of sodium hydroxide (1.25 mols) and 62 gm. of boric acid (1 mol) are added to 229 gm. of 2-chloro-4-nonyl-phenol (0.9 mol). 59.5 gm. of acetaldehyde (1.35 mols) are then slowly delivered into the well-stirred mixture. After 0.5 hour, the temperature is slowly raised to reach 80° C. within another hour. After stirring for 20 hours at 80° C., the temperature is raised again, and the mixture is refluxed for 6 hours (diluting water is added in the course of the condensation to maintain thorough mixing). After cooling to room temperature, the boron complex of 2-chloro - 4-nonyl-6-(1 hydroxyethyl)-phenol is thoroughly washed with water. By contacting the reaction mass repeatedly with dilute mineral acid (dilute $H_2SO_4$), the boron is removed in the aqueous phase, and the 2-chloro-4-nonyl-6-(1-hydroxyethyl)-phenol remains in the organic phase.

Example 8.—2,4-dinonyl-6-methylolphenol 12 gm. of sodium hydroxide (0.3 mol) and 28.6 gm. of borax (0.3 mol of boron) are dissolved in 140 ml. of water, and 10 ml. of methanol are added. 104 gm. of 2,4-dinonylphenol (0.3 mol) are than added, while stirring, followed by 63 gm. of 37% formaldehyde (0.78 mol). The temperature is then raised, and the mixture is kept well stirred at 60° C. for 88 hours. After cooling, the mixture is acidified with dilute sulfuric acid (after first adding 100 ml. of petroleum ether) to break up the boron complex formed by the reaction. The organic layer is then dried over sodium sulfate, and the petroleum ether evaporated in vacuo. The resulting 2,4-dinonyl-6-methylolphenol is obtained as a viscous oil.

Example 9.—2,4-di(tertiarybutyl)-6-methylolphenol 6 gm. of sodium hydroxide (0.15 mol) are dissolved in 100 ml. of water, 206 gm. (1 mol) of 2,4-di(tertiarybutyl)-phenol are blended in by stirring, and this is followed by the addition of 147 gm. of 37% formaldehyde (1.5 mols). The temperature is then raised to 65° C., and agitation is continued for 24 hours. The reaction mixture is then neutralized with dilute sulfuric acid and washed with water. The resulting viscous yellow mass consists mainly of crude 2,4 - di(tertiarybutyl)-6-methylolphenol which can be further purified by complexation.

Example 10.—2,4-di(secondary amyl)-6-methylolphenol 20 gm. of sodium hydroxide (0.5 mol) and 30.9 gm. of boric acid (0.5 mol) are dissolved in 200 ml. of water, and 60 ml. of methanol are added. 117 gm. of 2,4-di(secondary amyl)-phenol (0.5 mol) are then added while stirring, and this is followed by addition of 105 gm. of 37% formaldehyde (1.3 mols). The temperature is then raised, and the mixture is kept well stirred at reflux (89° C.) for 1½ hours, followed by 19 hours at 60 to 65° C. After cooling, the whole reaction mixture is acidified with dilute sulfuric acid in the presence of 200 ml. of petroleum ether to break up the boron complex. The organic layer is then dried over sodium sulfate, and the petroleum ether is evaporated in vacuo. The resulting 2,4 - di(secondary amyl)-6-methylolphenol is obtained as a brown, viscous oil.

Example 11.—2-ethyl-4-phenyl-6-methylolphenol 89 gm. of 2-ethyl-4-phenylphenol (0.45 mol) are suspended in 50 ml. of a water solution containing 4 gm. of sodium hydroxide (0.1 mol), and 53 gm. of 37% formaldehyde (0.65 mol) are slowly added. Under continued vigorous stirring, the temperature is slowly raised to 60° C. within 30 minutes and maintained at that temperature for 24 hours. 200 ml. of a water solution containing 33 gm. of sodium metaborate (0.5 mol) are then added, and the mixture is refluxed for 4 hours. After cooling to room temperature, the boron complex of 2-ethyl-4-phenyl-6-methylolphenol is thoroughly washed with water. By contacting the reaction mass repeatedly with dilute sulfuric acid, the boron is removed in the aqueous phase and the 2 - ethyl - 4-phenyl-6-methylolphenol is obtained in the organic phase.

Example 12.—2,4-dinonyl-6-(1-hydroxyethyl)-phenol 500 ml. of a water solution containing 50 gm. of sodium hydroxide (1.25 mols) and 62 gm. of boric acid (1 mol) are added to 312 gm. of technical grade 2,4-dinonylphenol (0.9 mol). 47.5 gm. of acetaldehyde (1.18 mols) are then slowly delivered into the well-stirred mixture. After one hour, the temperature is slowly raised to reach 80° C. within another hour. After stirring for 16 hours at 80° C., the temperature is again raised, and the mixture refluxed for four hours (diluting with water in the course of condensation to guarantee a thorough mixing by stirring). After cooling to room temperature, the boron complex of 2,4 - dinonyl - 6 - (1-hydroxyethyl)-phenol is thoroughly washed with water. By contacting the reaction mixture repeatedly with dilute sulfuric acid, the boron is removed in the aqueous phase, and the 2,4-dinonyl-6-(1-hydroxyethyl)-phenol is obtained in the organic phase.

Example 13.—The potassium salt of the boron complex of 2 - chloro - 4-(1,1,3,3-tetramethylbutyl)-6-methylolphenol The neutralized and washed crude 2-chloro-4-(1,1,3,3-tetramethylbutyl) - 6-methylolphenol from Example 5 is diluted with kerosene to 50% by weight. One mol of boron per mol of 2 - chloro-4(1,1,3,3-tetramethylbutyl)-phenol used at the start (in the form of potassium metaborate dissolved in minimum amount of cold water) is then contacted overnight with the crude methylolphenol. The precipitated white sticky mass is then sucked as dry as possible on a large Buchner funnel, repulped with a small quantity of methanol, and filtered again. Thus, the remaining water and kerosene, together with some non-methylolated starting material, are removed efficiently and facilitate the subsequent repulping with petroleum ether (twice with approximately one part per part of filter cake). The dried white powder consists of a mixture of the potassium salts of one borate ion complexed with one or two molecules of 2 - chloro - 4 - (1,1,3,3-tetramethylbutyl)-6-methylolphenol. Should the potassimum-boron complex still contain non-methylolated starting phenol, the whole complexation and repulping procedure described above can be repeated, after breaking up the obtained complex by acidification with dilute mineral acid in the presence of kerosene (to yield an approximately 50% solution). This Example 14.—The sodium salt of the boron complex of 2,4-di(tertiaryamyl)-6-methylolphenol 20 gm. of NaOH (0.5 mol) and 30.9 gm. of boric acid (0.5 mol) are dissolved in 200 ml. of water, after which about 60 ml. of methanol is added thereto. 117 gm. of 2,4-di(tertiaryamyl)-phenol (0.5 mol) are then blended in, while stirring, followed by 105 gm. of 37% formaldehyde (1.3 mols). The temperature is then raised, and the mixture agitated at 60° C. for 20 hours, then at 80° C. for 1½ hours. The cooled, very viscous amber mass is repulped repeatedly with water to remove the catalyst and excess formaldehyde. The resulting crude sodium salt of the boron complex of 2,4-di(tertiaryamyl)-6-methylolphenol is contaminated with about 20% of non-methylolated starting material, which is removed by repulping the mass three times with petroleum ether. The sodium-boron complex is recrystallized from hydrophilic organic solvents. Analysis of the white solids shows a mixture of the sodium salts of one borate ion complexed with one and two molecules of 2,4-di(tertiaryamyl)-6-methylolphenol.

While the present invention has been described with respect to what at present are considered to be preferred embodiments thereof, it will be understood of course that certain changes, substitutions, modifications and the like may be made therein without departing from its true scope.

I claim:
1. A composition consisting essentially of a compound having the formula

(II)

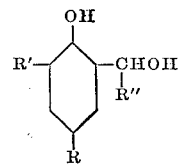

wherein one of R and R' is halogen and the other is selected from the group consisting of alkyl groups having from 4 to 24 carbon atoms per group and aryl groups having from 6 to 24 carbon atoms per group, and R" is a group selected from the group consisting of hydrogen, alkyl groups having from 1 to 7 carbon atoms per group and aryl groups having from 6 to 10 carbon atoms per group, and an organic carrier for said compound selected from the group consisting of kerosene and octane.

2. The composition of claim 1 wherein the compound of said formula is 2-chloro-4-(1,1,3,3-tetramethylbutyl)-6-methylolphenol.

References Cited
UNITED STATES PATENTS 2,732,406   1/1956   Lambert.
2,792,428   5/1957   Piki.

LEON ZITVER, Primary Examiner

N. P. MORGENSTERN, Assistant Examiner